(12) United States Patent
Kishida et al.

(10) Patent No.: US 11,867,576 B2
(45) Date of Patent: Jan. 9, 2024

(54) OPTICAL CABLE

(71) Applicant: PETROLIAM NASIONAL BERHAD (PETRONAS), Kuala Lumpur (MY)

(72) Inventors: Kinzo Kishida, Kobe (JP); Ahmad Riza Ghazali, Kajang (MY); Mohamad Faizal Bin Abd Rahim, Kajang (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 17/642,618

(22) PCT Filed: Sep. 11, 2020

(86) PCT No.: PCT/MY2020/050084
§ 371 (c)(1),
(2) Date: Mar. 11, 2022

(87) PCT Pub. No.: WO2021/049929
PCT Pub. Date: Mar. 18, 2021

(65) Prior Publication Data
US 2022/0341798 A1    Oct. 27, 2022

(30) Foreign Application Priority Data
Sep. 13, 2019   (MY) ................. PI 2019005315

(51) Int. Cl.
*G01L 1/24* (2006.01)
*G01D 5/26* (2006.01)
*G01H 9/00* (2006.01)

(52) U.S. Cl.
CPC .............. *G01L 1/242* (2013.01); *G01D 5/268* (2013.01); *G01H 9/006* (2013.01)

(58) Field of Classification Search
CPC ....... G01L 1/242; G01L 3/1435; G01D 5/268; G01H 9/006; G01H 9/004; G02B 6/4415
See application file for complete search history.

(56) References Cited

U.S. PATENT DOCUMENTS

| 4,832,437 A | 5/1989 | Kim et al. |
| 2004/0208224 A1* | 10/2004 | Ruffa ................. G01K 11/32 374/161 |

(Continued)

FOREIGN PATENT DOCUMENTS

EP    3470796 A1    4/2019

OTHER PUBLICATIONS

International Search Report and Written Opinion of the International Searching Authority issued in PCT/MY2020/050084, dated Jan. 29, 2021; ISA/KR (10 pages).

*Primary Examiner* — John Bedtelyon
(74) *Attorney, Agent, or Firm* — Harness, Dickey & Pierce, P.L.C.

(57) ABSTRACT

An optical cable (31) includes: a stress wave detection optical cable (30) having an optical fiber (7) and a plurality of first steel wires (8) which are helically wound so as to surround the optical fiber (7) and which are surrounded by a flexible material (9); and second steel wires (32) different from the first steel wires (8). The stress wave detection optical cable (30) and the plurality of second steel wires (32) are helically wound to form one annular body as a whole, and a winding angle (α) of the stress wave detection optical cable (30) with respect to the axis is determined by a property value prescribed by Lamé constants of the flexible material (9).

5 Claims, 16 Drawing Sheets

(56) References Cited

U.S. PATENT DOCUMENTS

2012/0125596 A1   5/2012  Homa et al.
2017/0134693 A1*  5/2017  Chapman ............... H01B 7/182
2018/0274954 A1   9/2018  Pacini et al.

* cited by examiner

FIG. 6

TABLE 1

| $\alpha_{opt}$ | $A_{opt}$ | $\varepsilon f/\varepsilon 0$ |
|---|---|---|
| 45 | 2.00 | 0.50 |
| 50 | 2.84 | 0.59 |
| 55 | 4.08 | 0.67 |
| 60 | 6.00 | 0.75 |
| 65 | 9.20 | 0.82 |
| 70 | 15.10 | 0.88 |
| 73 | 21.40 | 0.91 |
| 75 | 27.86 | 0.93 |
| 80 | 64.33 | 0.97 |

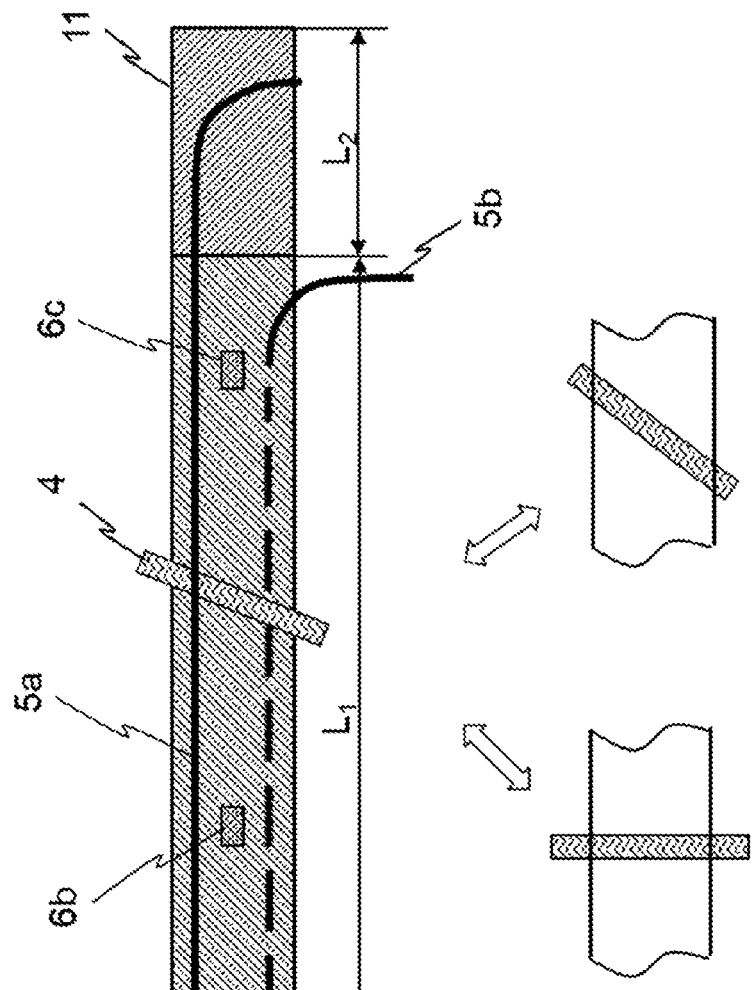

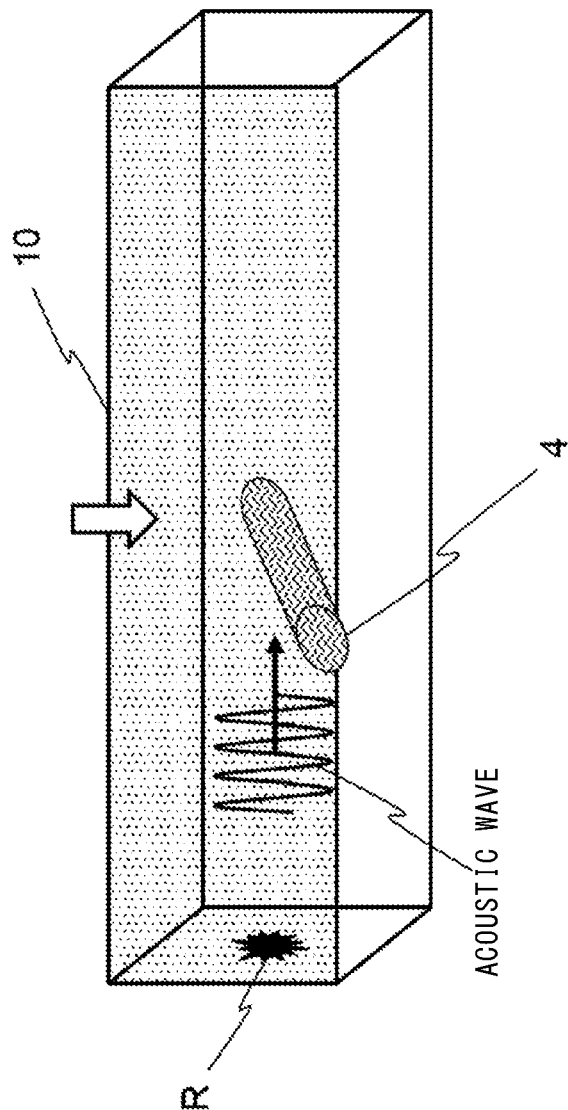
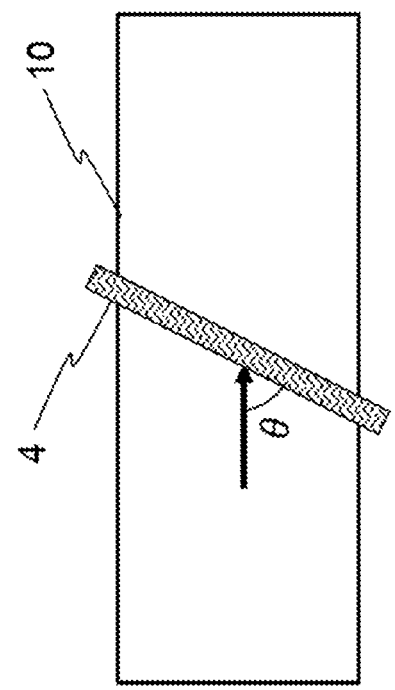
FIG. 9A
FIG. 9B

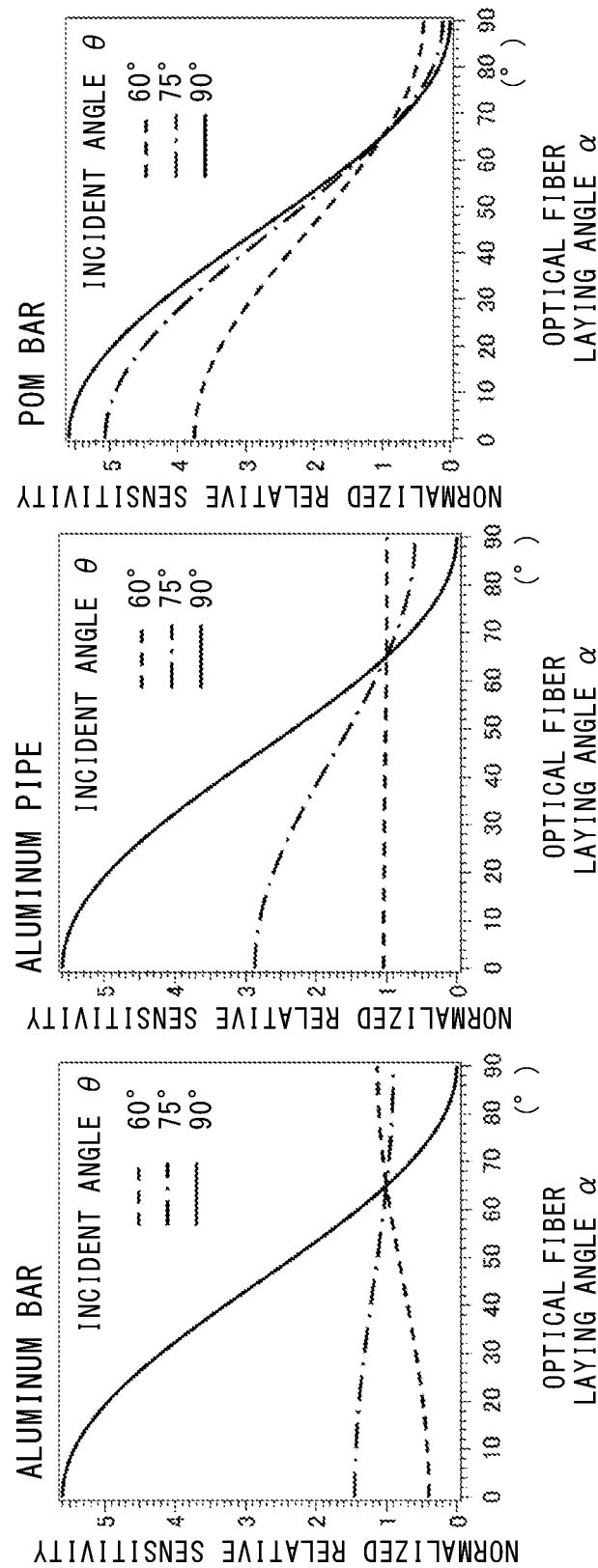

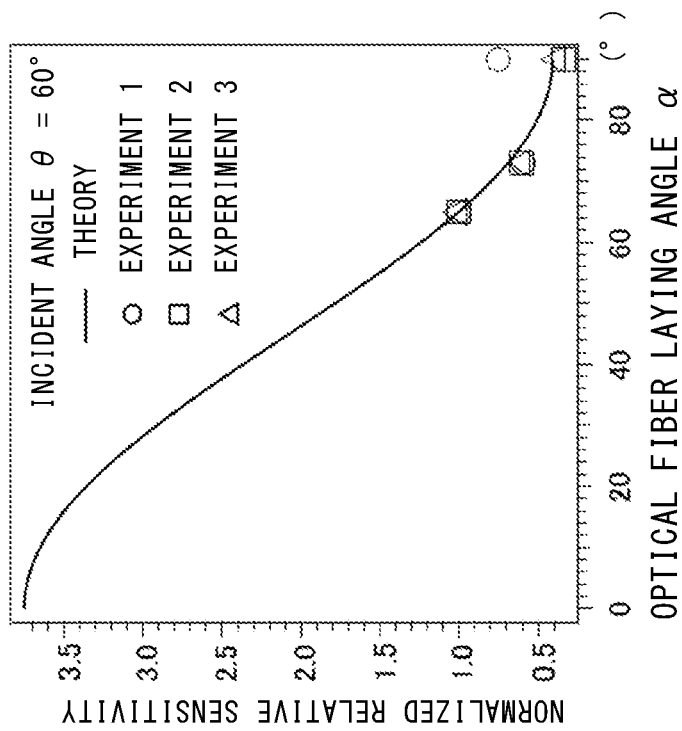
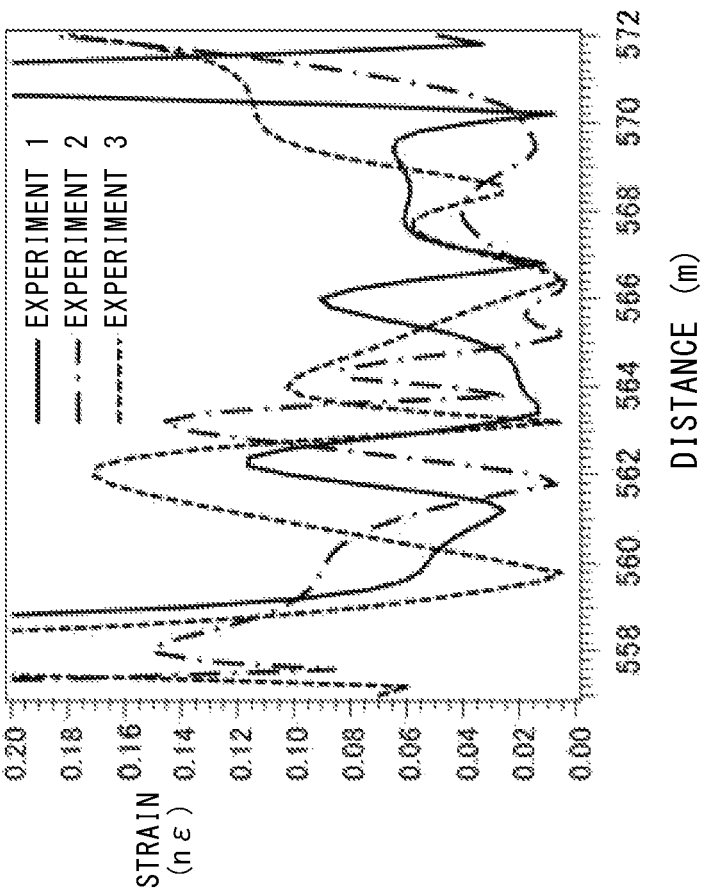
FIG. 15B
FIG. 15A

FIG. 16

TABLE 2
VARIATION IN RELATIVE SENSITIVITY DEPENDING ON DIFFERENCE IN (MATERIAL OF) CORE OF OPTICAL CABLE

| CORE | STRAIN RATIO PARAMETER A | INCIDENT ANGLE (°) | RELATIVE SENSITIVITY WITH RESPECT TO OPTICAL FIBER LAYING ANGLE $\alpha$ (UNIT: °) | | |
|---|---|---|---|---|---|
| | | | 65 | 73 | 90 |
| ALUMINUM BAR | 0.23 | 60 | 0.090 | 0.097 | 0.159 |
| | | 75 | 0.418 | 0.220 | 0.124 |
| | | 90 | 0.395 | 0.128 | 0.035 |
| POM BAR | 6.21 | 60 | 0.354 | 0.212 | 0.266 |
| | | 75 | 1.500 | 0.876 | 0.740 |
| | | 90 | 0.386 | 0.357 | 0.280 |

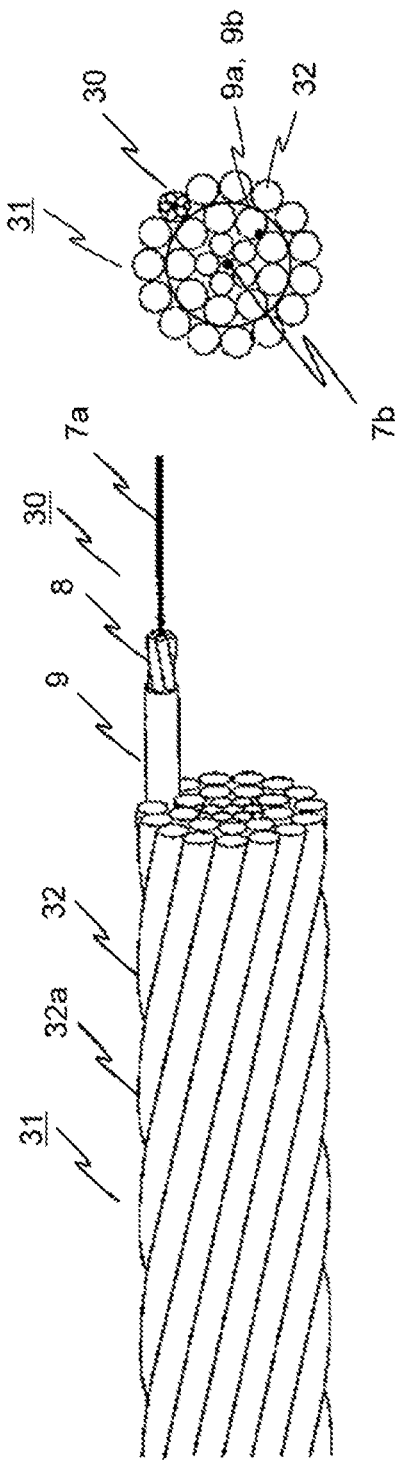
FIG. 17A
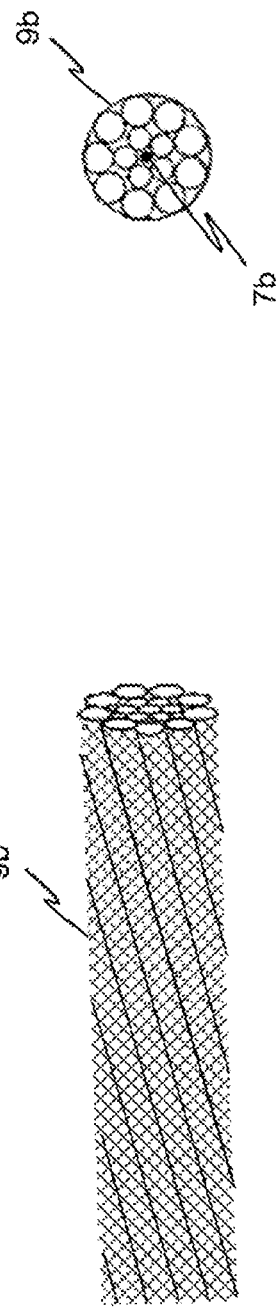
FIG. 17B
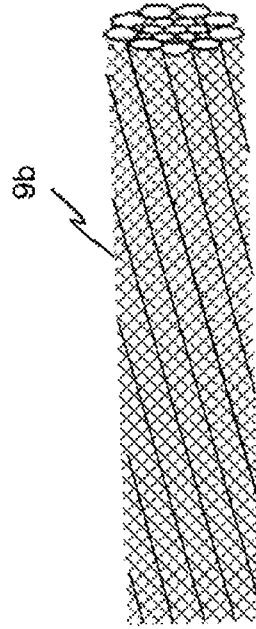
FIG. 17C
FIG. 17D

OPTICAL CABLE

CROSS REFERENCE TO RELATED APPLICATIONS

This application is a U.S. National Phase Application under 35 U.S.C. 371 of International Application No. PCT/MY2020/050084 filed on Sep. 11, 2020, which claims the benefit of priority from Malaysian Patent Application No. PI 2019005315 filed Sep. 13, 2019. The entire disclosures of both of the above applications are incorporated herein by reference.

TECHNICAL FIELD

The present disclosure relates to an optical cable.

BACKGROUND ART

Conventionally, in development of oil wells, technologies for detecting underground resources using seismic waves are widely employed. Among these, technology of acquiring an acoustic wave, i.e., a strain change amount, at each point on an optical fiber in a distributed manner by distributed acoustic sensing (DAS) is spreading. In this case, the optical fiber is mounted to an optical cable and is embedded at a location near an oil well pipe constituting an oil well or in another underground channel. Then, waves from a vibration origin on the ground or the ocean are received, and thereafter, through analysis using vertical seismic profiling (VSP), or micro seismic (MS) studies, the three-dimensional structure of the underground part is grasped (see, for example, Non-Patent Document 1).

Detecting underground resources by using the method as described above has the following problems.

Firstly, in the case where the optical fiber is mounted substantially in the axial direction of the cable (see, for example, Non-Patent Document 1), the optical fiber does not respond to a seismic wave incident in the direction perpendicular to the optical cable. In particular, in the case of a horizontal well shown in FIG. 18, there is an especially high possibility that the response does not occur.

That is, as shown in FIG. 18, in the case where a cable 103 is laid along a well 102 under the ocean floor, the longitudinal laying direction of an optical fiber (not shown) which is a sensor provided in the cable 103 is approximately a horizontal direction (direction of arrow $D_H$ in FIG. 18), whereas the advancing direction of a vibration wave from a vibration origin is a direction (direction of arrow $D_V$ in FIG. 18) perpendicular to the horizontal direction. The direction of displacement occurring in the optical fiber due to the vibration wave, i.e., the direction of the cause for strain occurring in the optical fiber, is also perpendicular to the horizontal direction. Therefore, in the case where the direction of the vibration wave is such a direction, the optical fiber is unlikely to respond to the seismic wave.

Secondly, in the case where the optical fiber is helically mounted on the cable, influence on a received signal by torsional deformation is great, and in particular, a response to a transverse wave is nonlinear and therefore it is difficult to use this for quantitative analysis.

Thirdly, it is desirable that the size of the cable body is large (excellent performance is obtained with a diameter of 14 mm to 24 mm), and the resolution of the longitudinal-direction sensor increases as the winding diameter (cable body) of the fiber wound around the outer circumference of the cable increases, and as the pitch thereof decreases (see, for example, Patent Document 2). However, in the case where the size of the cable body is large as described above, the space for the oil well can be insufficient, and conversely, if the size of the cable body is reduced, the resolution of the sensor is deteriorated. In addition, since the cable body is made from plastic or a rubber material (see, for example, Patent Document 2), the strength of the cable itself is insufficient, and the heat resistance is also highly likely to be insufficient.

Fourthly, although there is a method of installing an optical fiber in a well by a technique such as coiled tubing, this method is provisional, and therefore is not suitable for long-term installation.

CITATION LIST

Patent Document

Patent Document 1: US 2018/0274954 A1
Patent Document 2: US 2018/0245957 A1

Non-Patent Document

Non-Patent Document 1: Andreas Wuestefeld, et al., "How to twist and turn a fiber: Performance modeling for optimal DAS acquisitions", THE LEADING EDGE, March 2019, pp. 306-311.
Non-Patent Document 2: B. N. Kuvshinov, "Interaction of helically wound fibre-optic cables with plane seismic waves", Geophsical Prospecting, 2016, 64, pp. 671-688.

SUMMARY OF THE INVENTION

Problems to be Solved by the Invention

The present invention has been made to solve the above problems, and an object of the present invention is to provide an optical cable having a structure that can effectively solve the above first to fourth problems, in order to detect underground resources by using seismic waves.

Solution to the Problems

An optical cable according to the present disclosure is an optical cable for measuring a stress wave generated by vibration of a measurement target, the optical cable including: a stress wave detection optical cable including an optical fiber provided at an axial part, a plurality of first steel wires helically wound so as to surround the optical fiber, and a flexible material surrounding the optical fiber and the plurality of first steel wires; and second steel wires different from the first steel wires, wherein the stress wave detection optical cable and the second steel wires are helically wound to form one annular body as a whole, and a winding angle of the stress wave detection optical cable with respect to an axis of the optical cable is associated with a property value prescribed by Lamé constants derived from an elastic modulus and a Poisson's ratio of the flexible material.

Effect of the Invention

The optical cable according to the present disclosure can obtain a significant effect that it becomes possible to provide an optical cable having a structure that can effectively solve the above first to fourth problems, in order to detect underground resources by using seismic waves.

BRIEF DESCRIPTION OF THE DRAWINGS

FIG. 6 shows a specific numerical value example of an optical fiber laying angle, a strain ratio parameter, and a relative sensitivity ratio for strain, that satisfy the specifications of the optical cable according to embodiment 1.

FIGS. 8A to 8D show the configuration of a sample model for experimentally considering the specifications of the optical cable according to embodiment 1.

FIGS. 9A and 9B show a model for DAS measurement for experimentally considering the specifications of the optical cable according to embodiment 1.

FIGS. 11A to 11C show the relationship between an optical fiber laying angle and a normalized relative sensitivity, calculated through analysis for considering the specifications of a core of the optical cable according to embodiment 1.

FIGS. 15A and 15B show an example of comparison between the experimental result of measurement by DAS using the experimental equipment shown in FIG. 12, and a result obtained by analysis, regarding a normalized relative sensitivity.

FIG. 16 shows, by specific numerical values, the influence of the cable material on the relative sensitivity of the optical cable according to embodiment 1.

FIGS. 17A to 17D show an example of the optical cable according to embodiment 1.

DESCRIPTION OF EMBODIMENTS

Embodiment 1

[Analytical Consideration—Case of Static Load]

First, an optical cable that is influenced by the direction of a vibration wave due to an earthquake, or an optical cable that is likely to be so influenced, will be considered. A model of the optical cable to be considered will be described first. As the optical cable, a columnar cable is assumed, and in the case where a static load is applied to the cable, the specifications that should be satisfied by the optical fiber helically mounted will be described below.

Figure 1A:
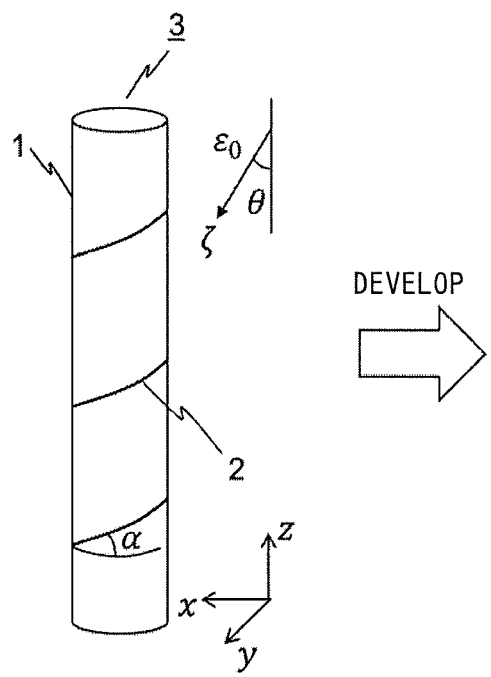
FIGS. 1A and 1B are model diagrams for considering the shape of an optical cable according to embodiment 1.
Figure 1B:
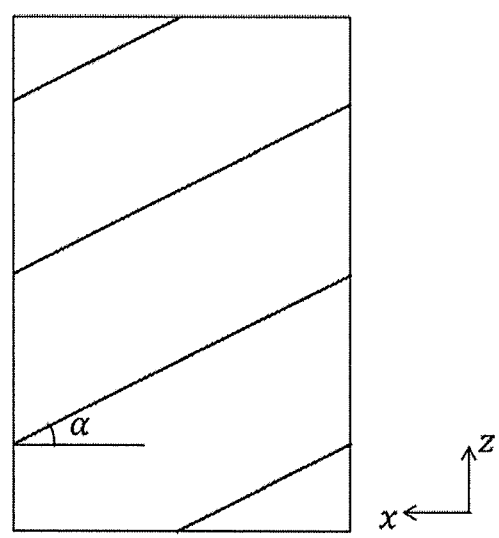

FIGS. 1A and 1B are model diagrams in the case where the optical fiber is helically mounted to the columnar cable. In these diagrams, the optical cable in which strain detected by the optical fiber is constant irrespective of the incident direction of a stress wave as a model of a seismic wave, will be considered. As parameters of the optical fiber, here, in particular, a laying angle of the optical fiber (which is also called winding angle; hereinafter, referred as optical fiber laying angle), and a strain ratio parameter between different materials in a uniform-stress model (the details of these parameters will be described later) are taken up and considered.

FIG. 1A shows a model of the optical cable. In FIG. 1A, an optical cable 3 is modeled to be formed from a core 1 and an optical fiber 2 helically wound around the core 1. Three arrows indicate three-dimensional coordinate axes x, y, z, and α indicates a laying angle (hereinafter, referred to as optical fiber laying angle) of the optical fiber 2. The optical fiber laying angle α is defined as the angle between the optical fiber 2 and the x axis (minus direction) on xz plane in FIG. 1B which shows a diagram obtained by developing FIG. 1A.

Here, for the optical cable 3, a $\xi\eta\zeta$ coordinate system which is rotated by $-\theta$ around y axis relative to the xyz coordinate system is introduced. The reason is as follows. In the $\xi\eta\zeta$ coordinate system, if strain $\varepsilon_0$ has occurred only in the $\zeta$-axis direction, the relationship between strain and stress can be simply represented using Lamé constants $\lambda$, $\mu$, as shown below. That is, if $\varepsilon_\xi=0$, $\varepsilon_\eta=0$, and $\varepsilon_\zeta=\varepsilon_0$ are satisfied, $\sigma_\xi=\lambda\varepsilon_0$, $\sigma_\eta=\lambda\varepsilon_0$, $\sigma_\zeta=(\lambda+2\mu)\varepsilon_0$ are obtained.

In this case, a vertical component of strain in the xyz coordinate system can be represented as shown in the following Expression (1).

$$\begin{cases} \varepsilon_x = \varepsilon_0 \sin^2\theta \\ \varepsilon_y = 0 \\ \varepsilon_z = \varepsilon_0 \cos^2\theta \end{cases} \quad (1)$$

Figure 2A:
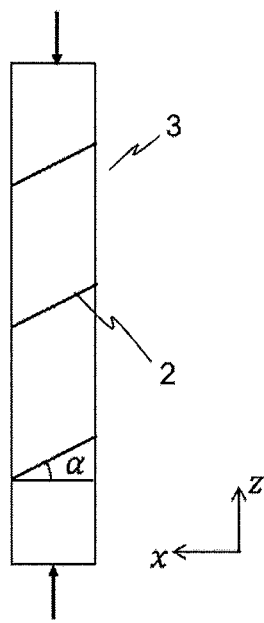
FIGS. 2A and 2B are model diagrams in the case where the optical cable shown in FIGS. 1A and 1B is subjected to stress in the axial direction.
Figure 2B:
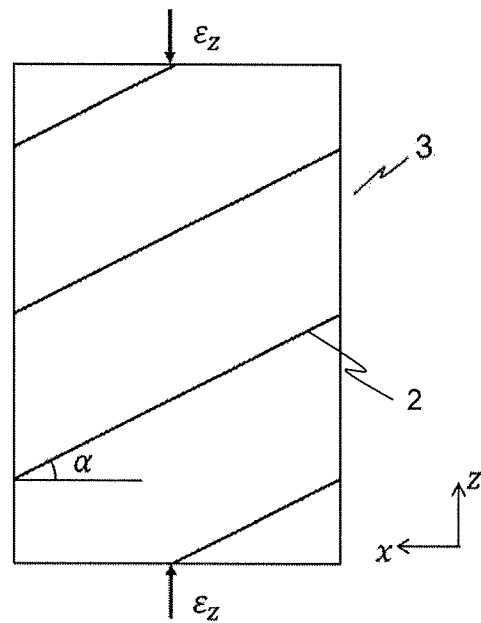

Then, as shown in FIG. 2A and FIG. 2B, the case where the optical cable 3 is subjected to stress in the z direction and strain $\varepsilon_z$ occurs therein, is assumed. In the case of FIG. 2A and FIG. 2B, from Expression (1), strain in the optical fiber 2 is represented as shown in Expression (2), using the strain $\varepsilon_z$ and the optical fiber laying angle α.

$$\varepsilon_f^z = \varepsilon_z \sin^2\alpha \quad (2)$$

Figures 3A, 3B, 3C:
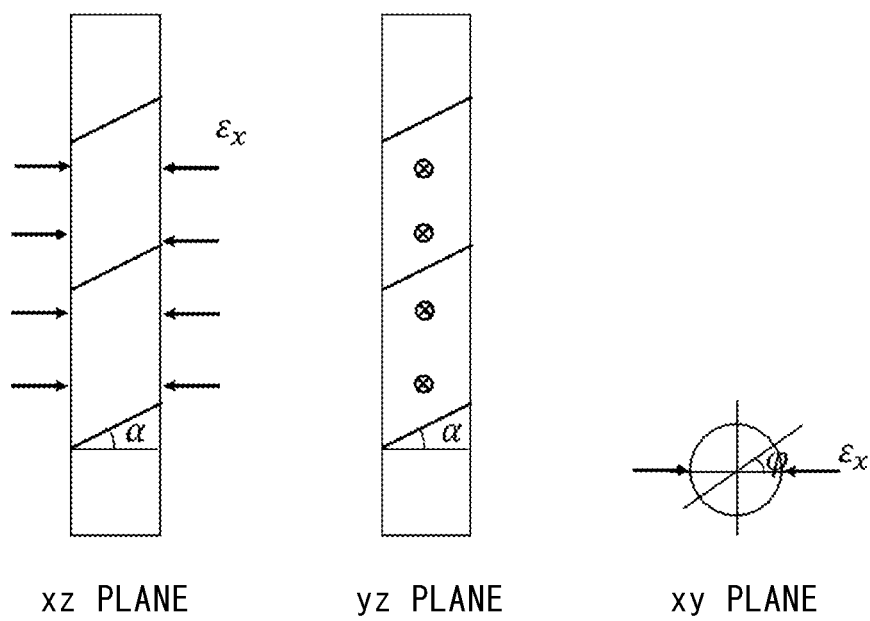
FIGS. 3A, 3B, and 3C are model diagrams in the case where the optical cable shown in FIGS. 1A and 1B is subjected to stress in the radial direction.

Next, as shown in FIG. 3A, FIG. 3B, and FIG. 3C, in the case where the optical cable is subjected to stress in the x direction and strain $\varepsilon_x$ occurs therein, the value of strain sensed by the optical fiber differs depending on an angular position φ (see FIG. 3C) in the circumferential direction of the optical fiber. Specifically, the strain is represented by, for example, Expression (3) and Expression (4).

$$\varepsilon_f^x(\varphi) = 0 \quad (\varphi = 0, \pi) \quad (3)$$

$$\overline{\varepsilon_f^x}(\varphi) = \varepsilon_x \cos^2\alpha \quad \left(\varphi = \frac{\pi}{2}, \frac{3\pi}{2}\right) \quad (4)$$

Further, a general formula, including the above expressions, is represented by Expression (5).

$$\varepsilon_f^x(\varphi) = \varepsilon_x \cos^2\alpha \sin^2\varphi (\varphi=\text{ARBITRARY}) \quad (5)$$

In addition, in the case where the optical cable is sufficiently long and the helix pitch of the cable is sufficiently smaller than the spatial resolution of a measurement instrument, the strain is represented as shown in Expression (6), taking an average in the longitudinal direction of the optical cable.

$$\overline{\varepsilon_f^x}(\varphi) = \frac{1}{2\pi}\int_0^{2\pi} \varepsilon_x \cos^2\alpha \sin^2\varphi \, d\varphi \quad (6)$$
$$= \frac{1}{2}\varepsilon_x \cos^2\alpha$$

From the above, in the case where strain $\varepsilon_0$ has occurred in only the $\zeta$ axial direction, the strain sensed by the optical fiber is represented as shown in Expression (7).

$$\varepsilon_f = \varepsilon_z \sin^2\alpha + \frac{1}{2}\varepsilon_x \cos^2\alpha \quad (7)$$
$$= \varepsilon_0 \left\{ \cos^2\theta \sin^2\alpha + \frac{A}{2}\sin^2\theta \cos^2\alpha \right\}$$

Figure 4:
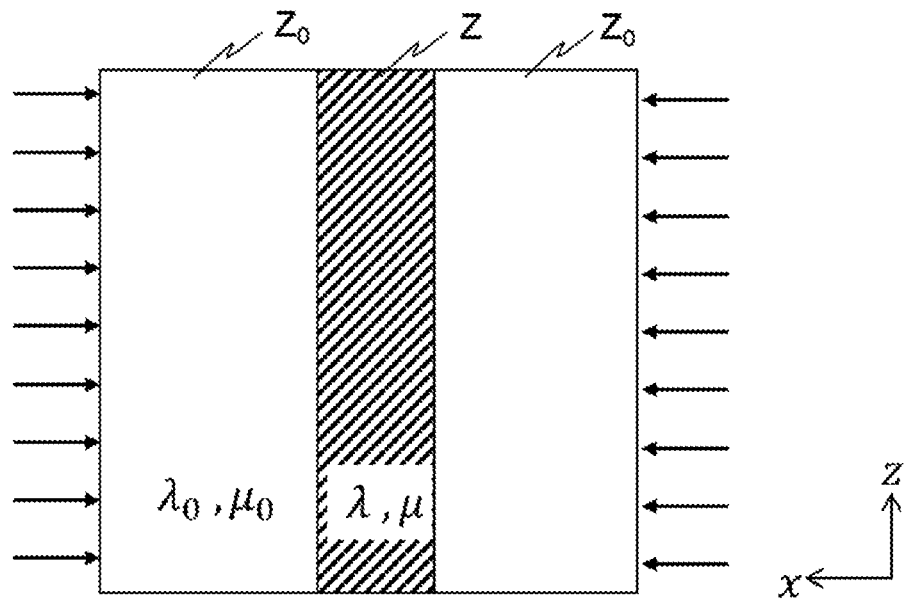
FIG. 4 is a diagram showing a static load model for considering the specifications of the optical cable according to embodiment 1.

Here, A is a strain ratio parameter, and is represented by Expression (8), using a total of four Lamé constants $\lambda_0$, $\mu_0$, $\lambda$, $\mu$ of two different materials $Z_0$, Z shown in a one-dimensional uniform stress model including the two different materials $Z_0$, Z in FIG. 4. Here, the different materials $Z_0$, Z correspond to, for example, bedrock which is an object surrounding the optical cable, and the optical cable.

$$A = \frac{\lambda_0 + 2\mu_0}{\lambda + 2\mu} \quad (8)$$

It is noted that the above A is equal to the strain ratio between the two different materials, calculated from the relationship between stress and strain in the one-dimensional uniform stress model shown in FIG. 4. That is, stress in the x direction is constant on the material surfaces of the different materials. Where the constant stress value is denoted by $\sigma_0$, $\sigma_0$ is represented as $\sigma_0 = (\lambda_0 + 2\mu_0)\varepsilon_0 = (\lambda + 2\mu)\varepsilon$. Therefore, $\varepsilon/\varepsilon_0 = (\lambda_0 + 2\mu_0)/(\lambda + 2\mu)$ is obtained, and the value on the right-hand side thereof is equal to the above value of A.

From Expression (7), it is found that strain $\varepsilon_f$ of the optical fiber does not depend on the angular position $\varphi$ in the circumferential direction of the optical fiber. That is, the result does not change even if the direction of the strain rotates around the z axis. In addition, from the second term in Expression (7), it is found that the stiffness in the side surface direction of the optical cable influences the sensitivity of the optical fiber, whereas the stiffness in the axial direction of the optical cable does not influence the sensitivity of the optical fiber.

Then, the optical fiber laying angle $\alpha$ and the strain ratio parameter A are set so as to satisfy the following Expression (9).

$$A = 2\tan^2\alpha \quad (9)$$

Figure 5:
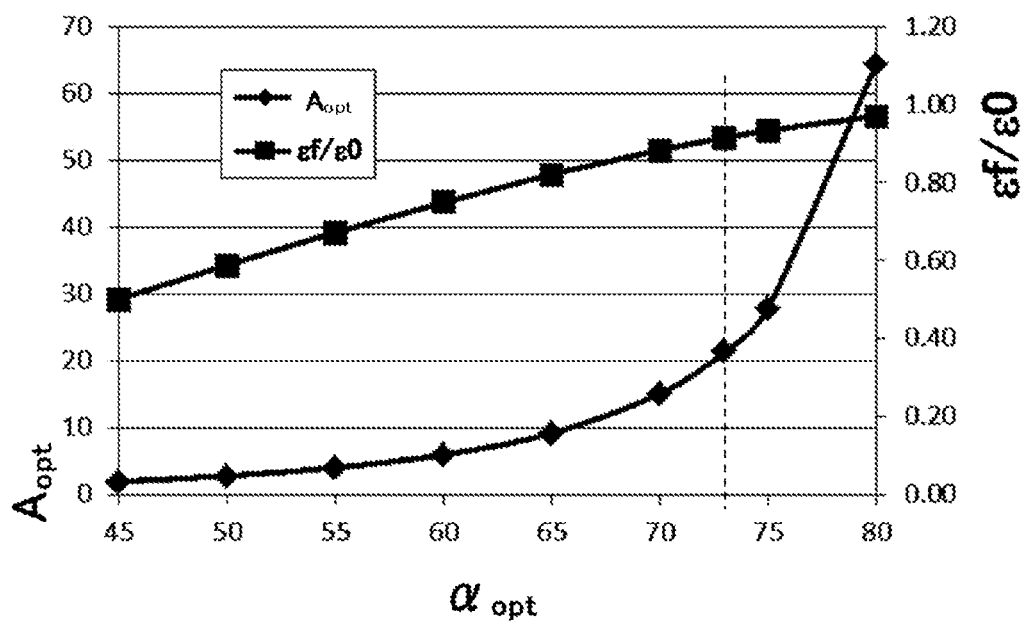
FIG. 5 shows the relationship between an optical fiber laying angle and a strain ratio parameter that satisfy the specifications of the optical cable according to embodiment 1.

In the case where $\alpha$ and A are set so as to satisfy Expression (9), strain detected by the optical fiber has a constant value represented by the following Expression (10), irrespective of the incident direction of the stress wave.

$$\varepsilon_f = \varepsilon_0 \sin^2\alpha \quad (10)$$

Where the optical fiber laying angle $\alpha$ and the strain ratio parameter A in the case of satisfying Expression (10) are respectively denoted by $\alpha_{opt}$ and $A_{opt}$, the relationship between $\alpha_{opt}$ and $A_{opt}$ is shown in FIG. 5, in which the horizontal axis indicates $\alpha_{opt}$ and the left vertical axis indicates $A_{opt}$. It is noted that the right vertical axis indicates a relative sensitivity ratio $\varepsilon_f/\varepsilon_0$ for strain. In this graph, a curve connecting rhombuses indicates change in $A_{opt}$ with respect to $\alpha_{opt}$, and a curve connecting squares indicates change in $\varepsilon_f/\varepsilon_0$ with respect to $\alpha_{opt}$. The relationship among $\alpha_{opt}$, $A_{opt}$, and $\varepsilon_f/\varepsilon_0$ described above is shown by specific numerical values in FIG. 6.

Specifically, for example, in the case of $\alpha_{opt}=73$ degrees as shown in a dotted line parallel to the vertical axis in FIG. 5, from FIG. 6, it is found that, when $A_{opt}$ is set to 21.4, the optical fiber can detect a stress wave of an earthquake with the relative sensitivity ratio $\varepsilon_f/\varepsilon_0$ being 0.91 close to 1. Thus, it is found that the stress wave can be detected with its magnitude hardly attenuated, irrespective of the incident direction of the stress wave. That is, it can be said that, if the optical fiber laying angle $\alpha$ and the like are set so as to satisfy the above relationship, the optical fiber can respond to a seismic wave, irrespective of the incident angle of the seismic wave. It is noted that, in the case of using an armored cable as a structure of the optical cable, A<1 is satisfied in general, and therefore the sensitivity is small. Therefore, in the present embodiment, a flexible material is used for a part of the cable so as to increase the sensitivity (the structure of the optical cable will be described later in detail).

In actuality, due to various conditions, it is often difficult to set the relationship between $\alpha$ and A so as to satisfy Expression (10), and therefore evaluation based on Expression (7) is reasonable. Accordingly, the influence of the incident angle $\theta$ of an acoustic wave (hereinafter, may be abbreviated as incident angle $\theta$) which is the parameter also needs to be taken into consideration.

[Analytical Consideration—Case of Dynamic Load]

Figure 7:
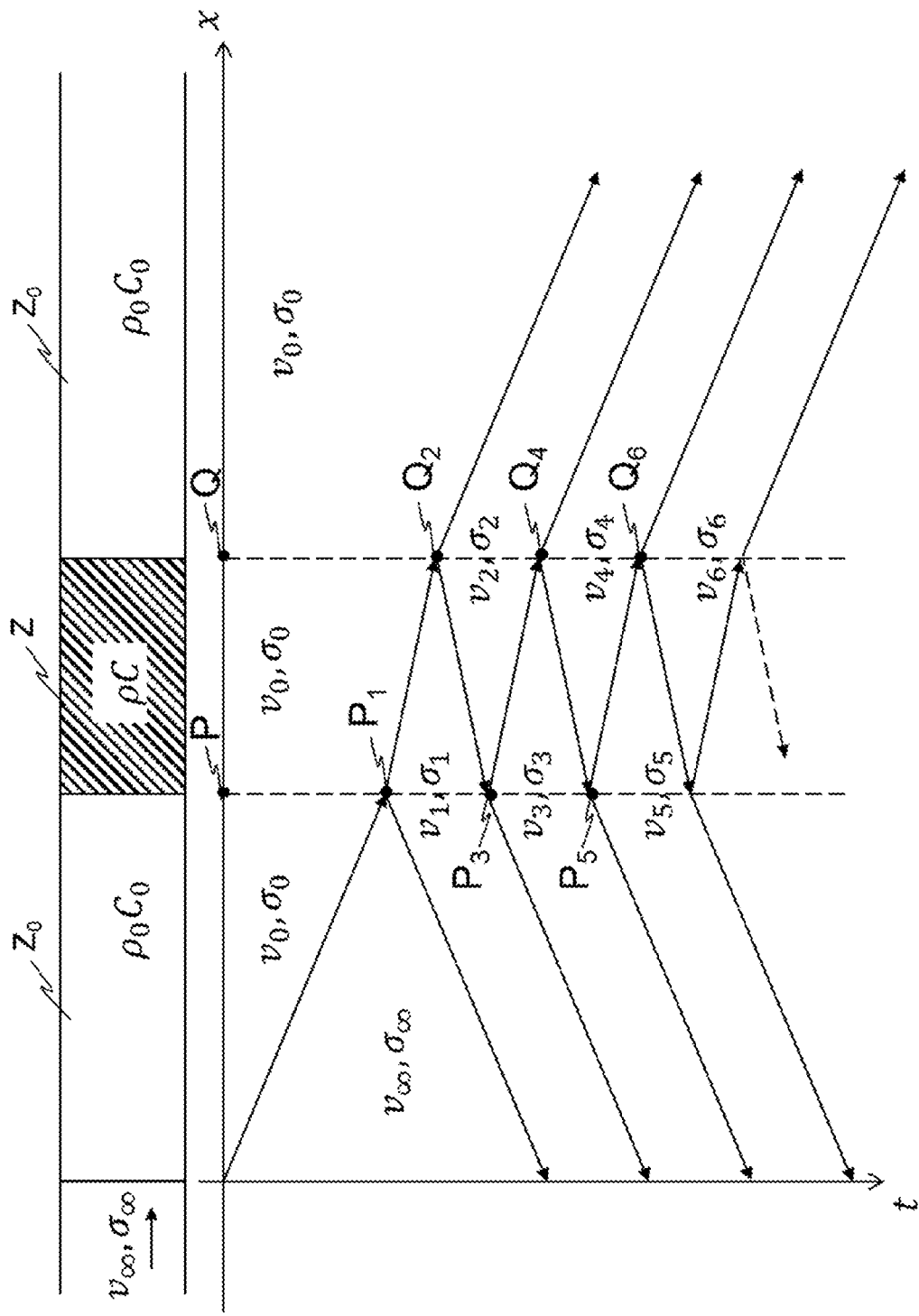
FIG. 7 is a diagram showing a dynamic load model for considering the specifications of the optical cable according to embodiment 1.

In the above description, the case where the load is static has been considered. Next, the case where the load is dynamic will be considered, using a model shown in FIG. 7. In FIG. 7, x on the horizontal axis indicates the position, and t on the vertical axis indicates time. In addition, $\rho_0$ and $\rho$ are the densities of the respective materials, and $C_0$ and C are the acoustic velocities in the respective materials. In addition, P and Q are symbols indicating the interfaces between the different materials. In this case, it is assumed that a plane wave with a particle velocity $v_\infty$ and stress $\alpha_\infty$ is incident perpendicularly on the interfaces of the different materials, and is reflected at the interfaces P and Q in a multiple manner.

In FIG. 7, where $\rho_0$ and $\rho$ are the densities of the respective materials and $C_0$ and C are the acoustic velocities in the respective materials, in a uniaxial-strain state, $C_0$ and C are represented by Expression (11) and Expression (12), respectively.

$$C_0 = \sqrt{\frac{\lambda_0 + 2\mu_0}{\rho_0}} \quad (11)$$

$$C = \sqrt{\frac{\lambda + 2\mu}{\rho}} \quad (12)$$

Where the particle velocity and stress in the initial state are respectively denoted by $v_0$ and $\sigma_0$, an incident wave oil, a transmitted wave $\sigma_t^1$, and a reflected wave $\sigma_r^1$ at point $P_1$ in FIG. 7 are respectively represented as $\sigma_i^1 = -\rho_0 C_0 v_\infty = \sigma_\infty$, $\sigma_t^1 = -\rho C(v_1 - v_0) = \sigma_1$, and $\sigma_r^1 = \rho_0 C_0(v_1 - v_0)$. From the balance of forces in the interface, $\sigma_i^1 + \sigma_r^1 = \sigma_t^1$ is satisfied. Therefore, with k represented by Expression (13), the following Expression (14) and Expression (15) are satisfied.

$$k = \frac{\rho C}{\rho_0 C_0} \quad (13)$$

$$v_1 = \frac{2}{k+1} v_\infty \quad (14)$$

$$\sigma_1 = \frac{2k}{k+1} \sigma_\infty \quad (15)$$

From the balance $(\sigma_i^n + \sigma_r^n = \sigma_t^n)$ of forces in the interface among an incident wave $\sigma_i^n$, a transmitted wave at $\sigma_t^n$, and a reflected wave $\sigma_r^n$ at point Qn (n=2m, m is an integer not less than 1) and point Pn (n=2m+1, m is an integer not less than 1) in FIG. 7, similarly, the following recurrence relations (16), (17) are obtained.

$$v_n = \frac{1}{k+1}\{2kv_{n-1} + (1-k)v_{n-2}\} \quad (16)$$

$$\sigma_n = \sigma_{n-1} + (-1)^n \rho C(v_n - v_{n-1}) \quad (17)$$

By solving the above recurrence relations, Expression (18) and Expression (19) regarding $v_n$ and $\sigma_n$ are obtained.

$$v_n = \left\{1 - \left(\frac{k-1}{k+1}\right)^n\right\} v_\infty \quad (18)$$

$$\sigma_n = \left\{1 - \left(\frac{1-k}{k+1}\right)^n\right\} \sigma_\infty \quad (19)$$

Here, Expression (20) is satisfied for any positive value k.

$$\left|\frac{k-1}{k+1}\right| < 1 \quad (20)$$

Therefore, when n approaches $\infty$, $v_n$ approaches $v_\infty$ and $\sigma_n$ approaches $\sigma_\infty$, from Expression (18) and Expression (19).

As described later, in the present embodiment, as compared to the cable in Patent Document 2, the cable diameter is smaller and a harder material can be used (specifically, an armored cable or the like can be used). Therefore, the speed increases, so that the above n substantially increases, and the response range is also wider.

This means that, if the wavelength of the incident wave is sufficiently greater than the sizes of the different materials, the stress approaches incident stress $\sigma_\infty$ through multiple reflections at the interfaces. That is, it is indicated that the same uniform stress model as in the case of static load is established also in the case of dynamic load. Thus, it is found that, also in the case of dynamic load, if $\alpha$ and A are set so as to satisfy Expression (9) as in the case of static load, the optical fiber can detect strain due to a stress wave, irrespective of the incident direction of the stress wave.

Here, since the stress in each layer is uniform as described above, it is found that the stiffness of the layer in which the optical fiber is embedded needs to be reduced, in order to improve sensitivity in strain measurement (it can be inferred that the sensitivity of the sensor for measuring strain can be increased by reducing the stiffness).

As described later, in the present embodiment, as compared to the cable in Patent Document 2, the cable diameter is smaller and a harder material can be used (specifically, an armored cable or the like can be used). Therefore, the speed increases, so that the above n substantially increases, and the response range is also wider.

The ease of transfer of a plane acoustic wave can be evaluated using an acoustic impedance $I_z$ ($I_z = \rho r C r$) represented by a density $\rho r$ of a measurement target which is a medium through which the plane acoustic wave is transferred, and an acoustic velocity Cr specific to the medium. Here, using a bulk modulus Kr of the medium, Cr is represented as $Cr = (Kr/\rho r)^{1/2}$, and therefore the acoustic impedance $I_z$ is equal to $(\rho r \times Kr)^{1/2}$. According to the multiple reflection theory, it is generally known that the ratio between the amplitude of an acoustic wave in a measurement target and the amplitude of an acoustic wave transferred to the optical fiber is represented by the ratio between their acoustic impedances.

[Consideration by Experiment]

Next, regarding the above analytical consideration result, consideration by an experiment is added, in order to clarify problems at the time of implementation. In the case of measuring a seismic wave, normally, the distance from the vibration origin is great, and therefore the seismic wave is often attenuated. Thus, it is considered that the level of the incident stress wave inputted to the optical cable becomes very small. Therefore, for detection of a seismic wave, distributed acoustic sensing (DAS) having excellent property in terms of sensitivity was used. Hereinafter, an experiment conducted using measurement by DAS (hereinafter, may be referred to as DAS measurement) will be described. In general, the spatial resolution of DAS is 20 cm or greater, and this value is sufficiently greater than the optical cable diameter. Therefore, measurement of strain by DAS can be treated in the same manner as in the measurement of static load described above.

First, experimental equipment for the experiment in which the DAS measurement was performed will be described with reference to the drawings. FIG. 8A, FIG. 8B, FIG. 8C, and FIG. 8D show the configuration of a sample model. Here, stress wave detection optical fibers 5a, 5b for DAS measurement are laid on the surface of a rectangular parallelepiped mortar block 10 in which a simulated cable 4 for verification is embedded (in the actual site, the experiment was conducted by replacing, with the mortar, bedrock and the like which were surrounding objects where the optical cable was placed). Regarding measurement of strain detected by the simulated cable 4, in order to attempt detection using a semiconductor strain gauge 6, three types of semiconductor strain gauges shown in the drawing, i.e., a trigger gauge 6a, an incident wave/reflected wave measurement gauge 6b, and a transmitted wave measurement gauge 6c are provided, whereby detection using these semiconductor strain gauges is also attempted at the same time (see FIG. 8A).

A length $L_1$ of the mortar block 10 is 1200 mm, and a cross-section size $L_3 \times L_4$ (see FIG. 8B) thereof is 200 mm×200 mm. A length $L_2$ of a stress wave trapping block 11 is 350 mm, and a cross-section size thereof is the same as that of the mortar block 10.

In addition, a plurality of simulated cables 4 with different optical fiber laying angles α are embedded in one mortar block 10 (see FIG. 8C and FIG. 8D shown on the lower side of outlined arrows in the drawing). The embedded location was the same cross-section position in the mortar block 10, and approximately three simulated cables 4 were embedded there at the same time.

In addition, in order to examine the influence of the incident angle of an acoustic wave to the simulated cables 4, three values were set as the incident angle in the experiment.

Further, in order to examine the influence of the materials of the cores of the simulated cables 4 to which the optical fiber was provided, the materials of the cores of the simulated cables 4 to be used in the experiment were changed. Specifically, the optical fiber laying angle α was set to three values, i.e., 65 degrees, 73 degrees, and 90 degrees; the incident angle was set to three values, i.e., 60 degrees, 75 degrees, and 90 degrees; and two kinds of materials, i.e., aluminum material and polyacetal resin material (hereinafter, may be abbreviated as POM material), were used as the materials for the cores, and the shapes thereof were all bar shapes. In the case of aluminum material, not only the bar-shaped core but also an annular core (pipe) was used in the experiment, in order to examine the influence of the elastic modulus.

Further, for simulating the incident stress, a shooting block is used. The shooting block was made by bonding a plurality of plates of polyvinyl chloride (hereinafter, may be abbreviated as PVC) or the like. For operating the shooting block, a shooting device was also prepared and used.

Next, the experimental model for DAS measurement will be described with reference to the drawings. FIG. 9A is a three-dimensional schematic view illustrating the experimental model. FIG. 9B is a top view when the three-dimensional schematic view shown in FIG. 9A is seen in the direction of an outlined arrow. As shown in FIG. 9A, the shooting block is caused to collide at a center position R on the left side surface of the rectangular parallelepiped mortar block 10 in which the simulated cable 4 is embedded (the center position R corresponds to the origin of an earthquake), to generate an acoustic wave (corresponding to a stress wave due to an earthquake) inside the mortar block 10. At this time, the acoustic wave advances in the arrow direction in FIG. 9A and FIG. 9B, and is propagated at the incident angle θ with respect to the longitudinal direction (axial direction) of the simulated cable 4 (see FIG. 9B).

Figure 10A:
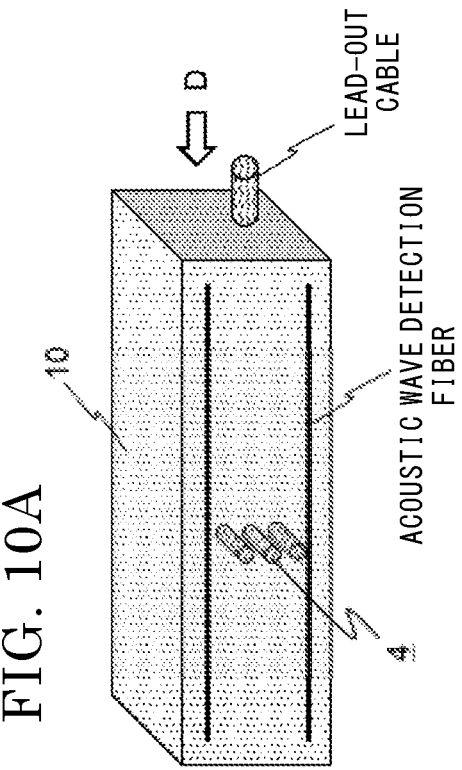
FIGS. 10A to 10C show the manner of arrangement and connection of an optical fiber for experimentally considering the specifications of the optical cable according to embodiment 1.
Figure 10B:
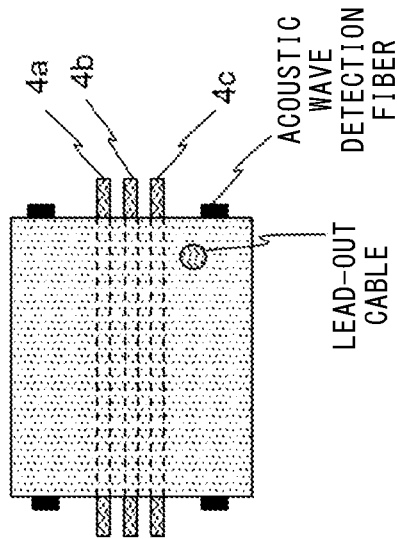
Figure 10C:
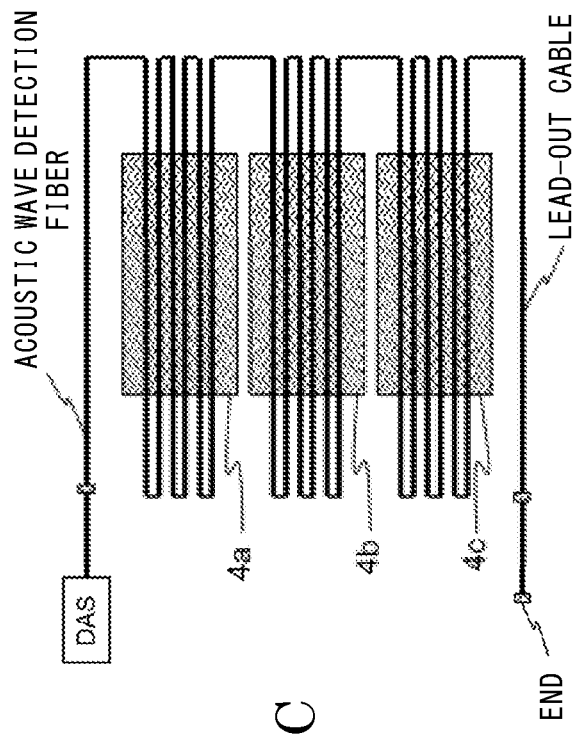

Next, the manner of arrangement and connection of the optical fiber in the experiment is shown in FIG. 10A, FIG. 10B, and FIG. 10C. FIG. 10A is a three-dimensional model view showing the outer appearance, FIG. 10B is a view as seen in the direction of arrow D in FIG. 10A, and FIG. 10C shows the details of installation of the optical fiber. In the actual measurement, as shown in FIG. 10A and FIG. 10B, besides the simulated cables 4, acoustic wave detection fibers are fixed on two side surfaces, and other fibers are embedded in the longitudinal direction inside the mortar block. Here, as shown in FIG. 10C, in order to detect an acoustic wave, normally, all the fibers are arranged so as to be continuously connected. As shown in FIG. 10B and FIG. 10C, the three simulated cables 4a, 4b, 4c are arranged adjacently so as to overlap in multiple layers sequentially from the upper side in the thickness direction of the rectangular parallelepiped mortar block. It is noted that, if some of the simulated cables arranged in the multiple layers are broken during assembly, the broken cables need to be removed.

Here, for comparison with the experimental result, a theoretical analysis result obtained in advance will be described. In this analysis, while an aluminum bar, an aluminum pipe, and a POM bar (polyacetal resin bar) were used as the materials of the cores, a theoretical relationship between the optical fiber laying angle α and a normalized relative sensitivity was calculated for each material. FIG. 11A, FIG. 11B, and FIG. 11C show a result thereof.

In each of these graphs, using the incident angle θ as a parameter, theoretical analyzed values for three cases of θ=60 degrees, 75 degrees, and 90 degrees are shown. In each of these graphs, it is found that, in a region in which the optical fiber laying angle α is smaller than the value at which the normalized relative sensitivity is 1, change in the normalized relative sensitivity with respect to the optical fiber laying angle α increases with increase in the incident angle θ.

Here, with S(θ, α, A) defined by Expression (21), the normalized relative sensitivity is a value calculated by Expression (22) on the basis of Expression (21) in the case of $\alpha_A$=65 degrees. In addition, the strain ratio parameter A is 0.233 for the aluminum bar, 0.695 for the aluminum pipe, and 6.211 for the POM bar.

$$s(\theta, \alpha, A) = \varepsilon_f/\varepsilon_0 = \cos^2\theta\sin^2\alpha + \frac{A}{2}\sin^2\theta\cos^2\alpha \quad (21)$$

$$S_n(\theta, \alpha) = \frac{s(\theta, \alpha, A)}{s(\theta, \alpha_A, A)} \quad (22)$$

Figure 12:
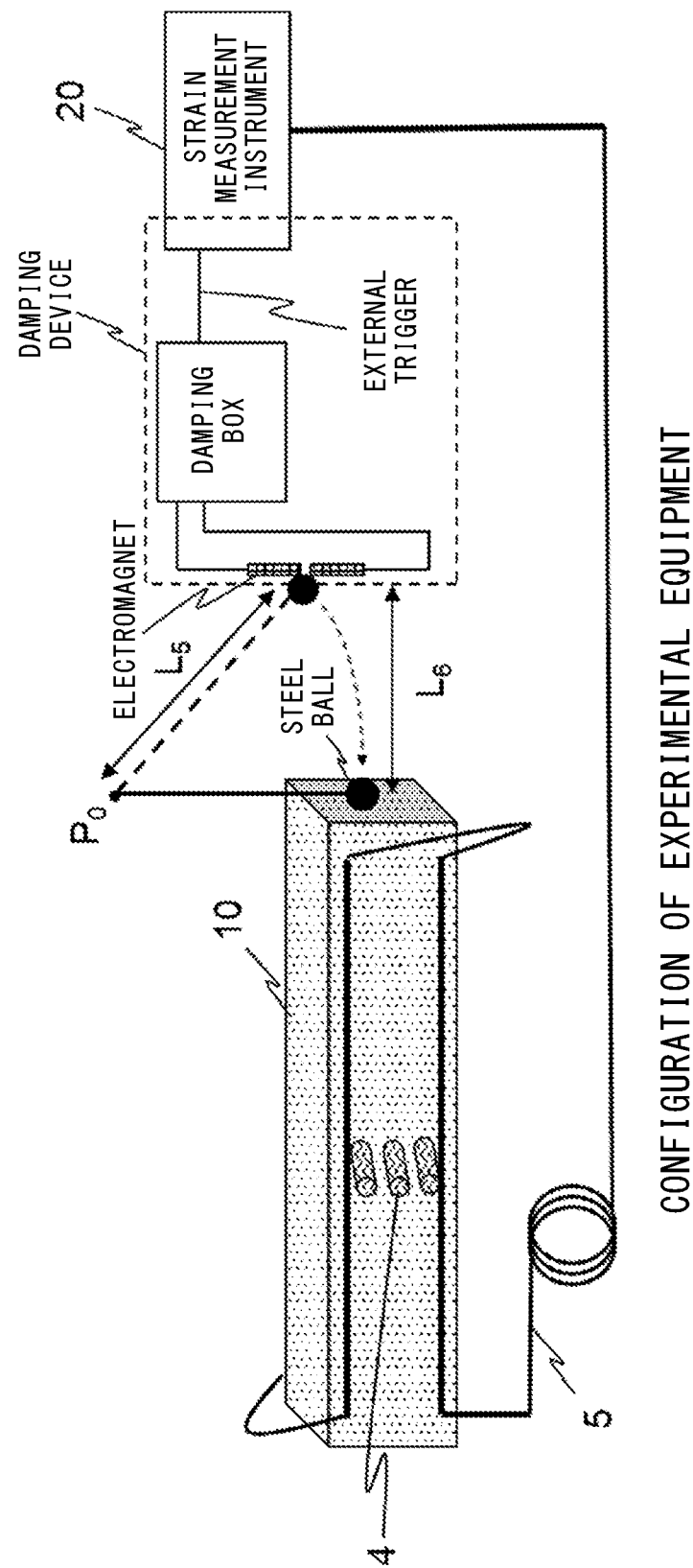
FIG. 12 shows the configuration of experimental equipment for experimentally considering the specifications of the optical cable according to embodiment 1.

FIG. 12 shows the configuration of the experimental equipment. By a damping device including an electromagnet, a damping box, and a processor (not shown) provided in a strain measurement instrument 20, which are enclosed by a broken line frame, at a desired timing, a steel ball is moved by $L_6$ in horizontal-distance equivalent, along a dotted-line arrow around a support point $P_0$, from a standby position on the damping device side separated from the support point $P_0$ by a distance $L_5$ indicated by a dotted line, so as to collide with a side surface of the mortar block 10. In the mortar block 10, three simulated cables 4 are provided, and a measurement optical fiber 5 having a length of about 500 m is arranged therewith. An acoustic wave generated in the mortar block 10 by the collision of the steel ball causes strain in the measurement optical fiber 5. The strain occurring in the measurement optical fiber 5 is measured by the strain measurement instrument 20. It is noted that the distance $L_5$ is 90.5 cm, $L_6$ is about 13 cm, and the movement period of the steel ball in the distance $L_6$ part is about 0.4 seconds.

Figures 13A, 13B:
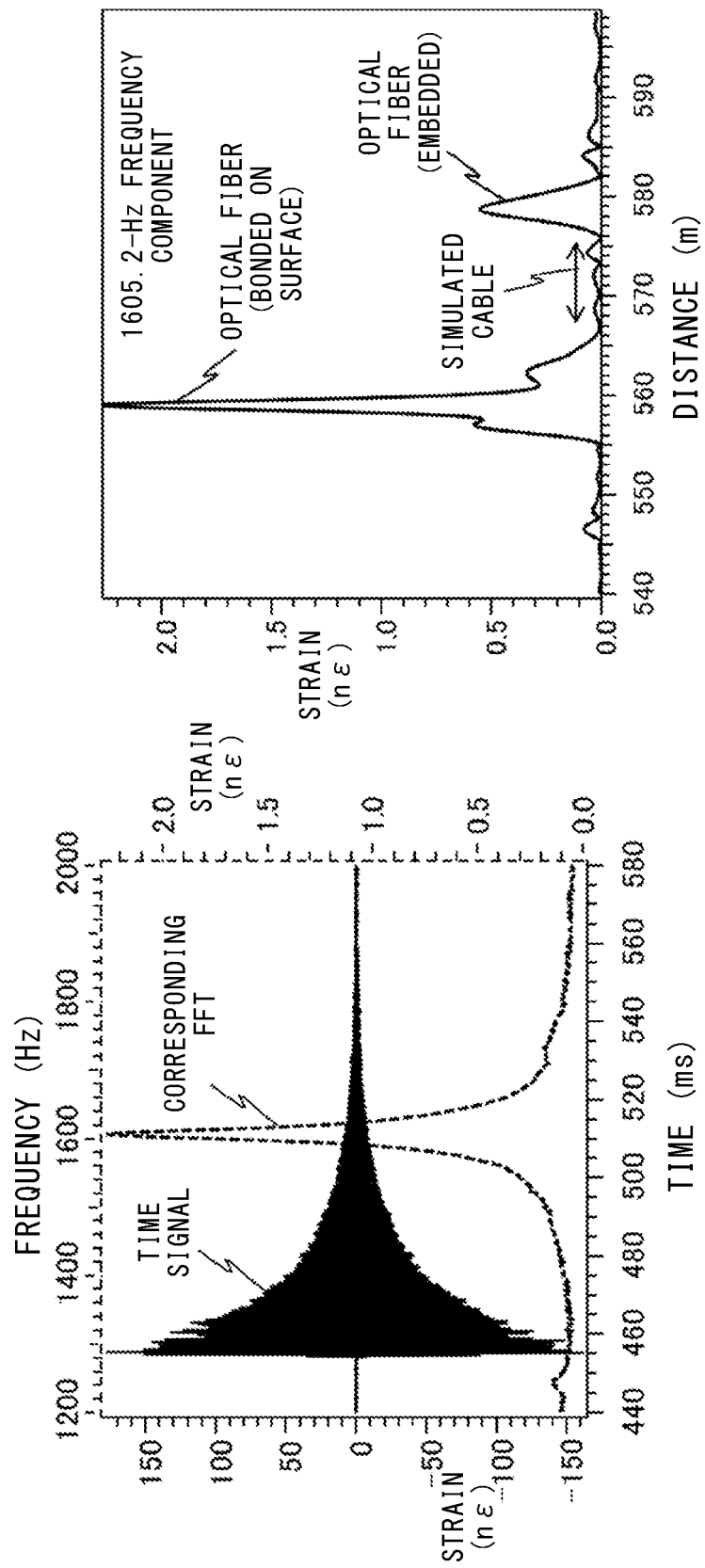
FIGS. 13A and 13B show an example of an experimental result of measurement by DAS using the experimental equipment shown in FIG. 12.

Next, a result of the measurement using the experimental equipment shown in FIG. 12 will be described below with reference to the drawings. FIG. 13A shows an example of the measurement result in time domain, and FIG. 13B shows an example of the measurement result in frequency domain. In FIG. 13A, a curve indicated by a solid line shows the measurement result, and the vertical axis at the left side and the horizontal axis at the lower side are reference axes therefor. Of the reference axes, the vertical axis indicates strain (unit: nε), and the horizontal axis indicates the elapsed time (unit: ms). The measurement position is 559 m. It is found that the vibration waveform attenuates in about 100 ms. On the other hand, a curve indicated by a dotted line shows a result of calculation of the corresponding fast Fourier transform (FFT) with respect to the time signal. The vertical axis indicated by a dotted line at the right side and the horizontal axis indicated by a dotted line at the upper side are reference axes therefor. Of the reference axes, the vertical axis indicates strain (unit: nε), and the horizontal axis indicates frequency (unit: Hz). From a result of the analysis by FFT, it is recognized that the peak frequency is 1605.2 Hz. Therefore, since the block length is 1.2 m, the speed of the acoustic wave is 3.85 km/s (=1.2 m×2×1605.2 Hz).

Next, FIG. 13B shows an example of a measurement result of DAS measurement of an acoustic wave (1605-Hz component) in the case where the simulated cable having the aluminum-bar core is used and the incident angle θ on the simulated cable is 60 degrees. In this graph, the horizontal axis indicates the measurement distance (position on the simulated cable) on the fiber (unit: m), and the vertical axis indicates the amount of strain that occurs (unit: nε). A curve in the graph indicates the measurement result, and in particular, regarding a frequency component of about 1605 Hz, shows the amount of strain due to an acoustic wave (peak component) generated in the fiber or the measurement target cable at each measurement position (distance) along the simulated cable.

From the graph, it is found that the maximum peak of strain appears approximately at a distance of 560 m. This is the strain occurring in the stress wave detection optical fiber bonded to the surface of the sample in FIGS. 8A to 8D described above. In addition, it is found that the second peak of strain appears approximately at a distance of 580 m. This is the strain occurring in the stress wave detection optical fiber embedded inside the sample in FIGS. 8A to 8D described above. Using the strain occurring in the stress wave detection optical fibers as an index, strain occurring in the simulated cables, i.e., strain occurring at the simulated cable positions indicated by the double-headed arrow in the graph, is analyzed.

The level (magnitude) of strain occurring in the simulated cables is smaller than the level of strain occurring in the stress wave detection optical fibers as shown above in FIGS. 13A and 13B. Therefore, next, the fact that also the strain occurring in the simulated cables can be certainly detected will be described with reference to another graph, FIG. 14.

Figure 14:
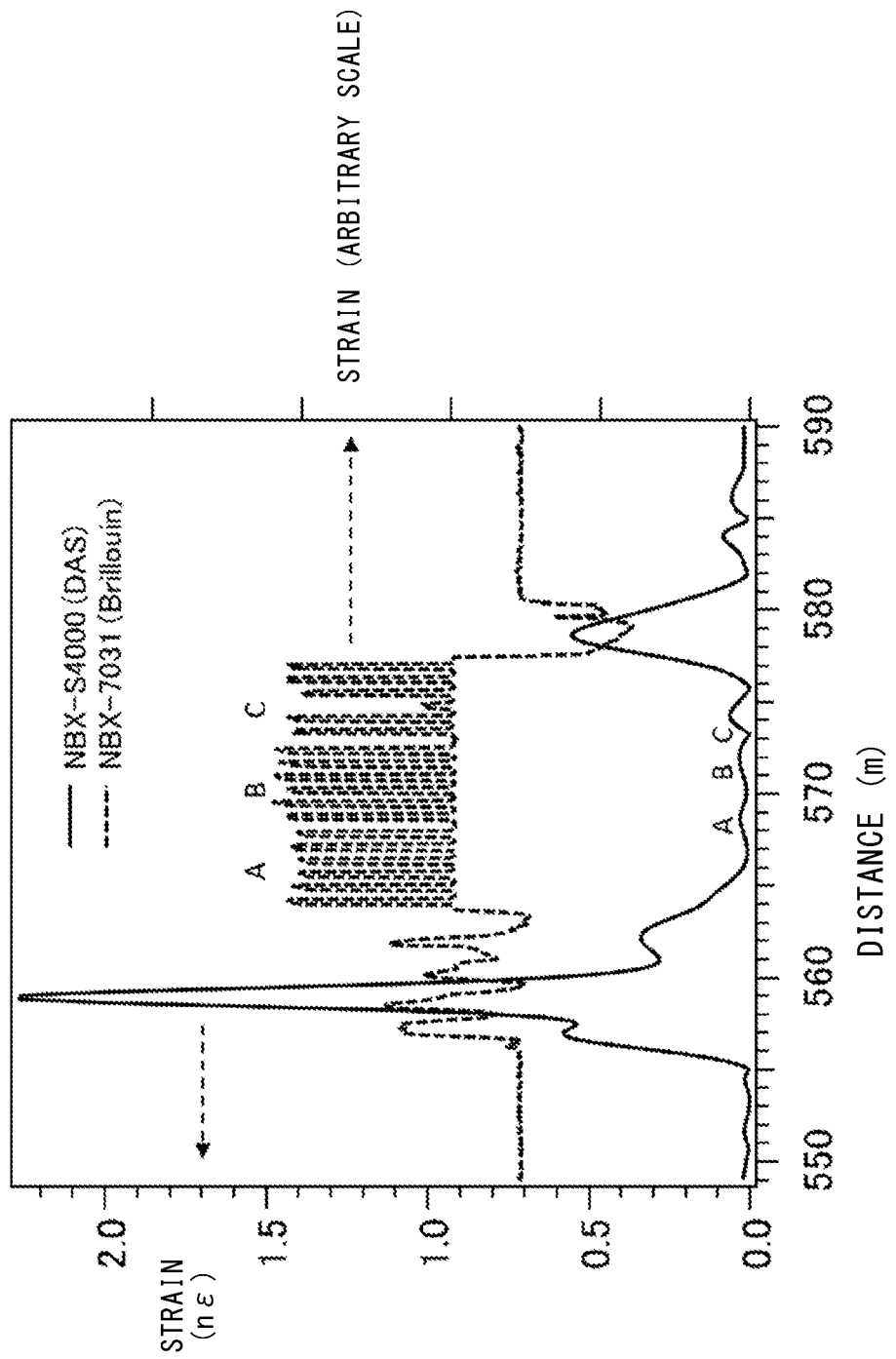
FIG. 14 shows the experimental result of measurement by DAS using the experimental equipment shown in FIG. 12, and an experimental result of measurement by frequency shift of Brillouin scattering light, together.
Figure 18:
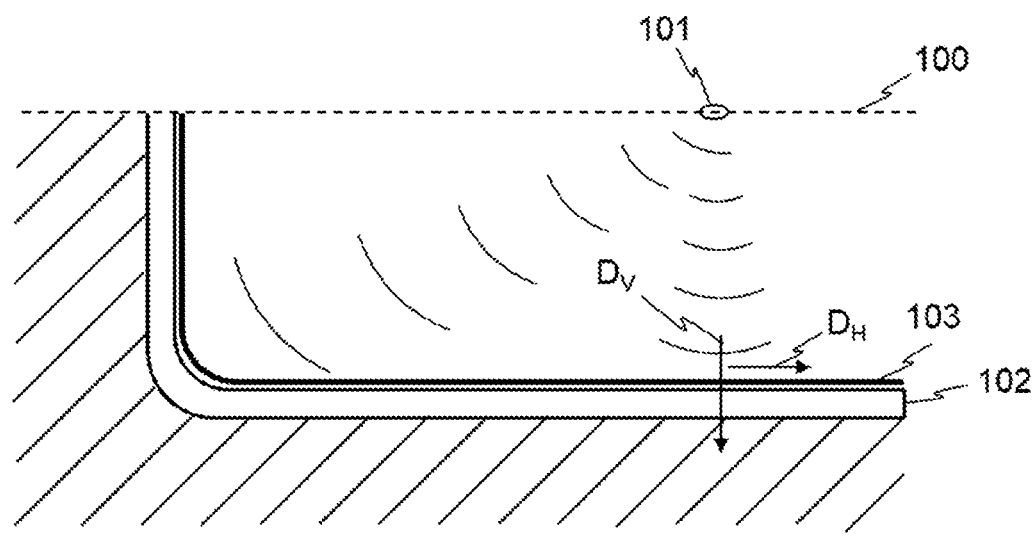
FIG. 18 is a diagram for explaining a problem to be solved in the present embodiment.

FIG. 14 shows the strain occurring in the simulated cables, together with data measured on the basis of Brillouin frequency shift of backscatter light, which is another strain measurement method. From the graph, it is found that Brillouin frequency shift occurs correspondingly at three positions A, B, C on the simulated cables (A, B, C respectively correspond to the simulated cables 4a, 4b, 4c shown above in FIGS. 10A to 10C) (the strain in this case corresponds to the scale on the right vertical axis in FIG. 14), and thus it is found that it is possible to measure an acoustic wave even by using the simulated cables.

Next, for the purpose of confirming reproducibility of the measurement and accuracy of the magnitude (strain amount) of the measured strain, a measurement result in the case of performing measurement using another core will be shown, and will be compared with the theoretical value of the normalized relative sensitivity described above. This result will be described below, with reference to FIG. 15A showing strain distribution in the longitudinal direction of the cable, and FIG. 15B showing comparison between the measurement result and the theoretical value based on analysis.

FIG. 15A and FIG. 15B are graphs showing measurement results in the case of measuring strain caused by an acoustic wave, three times by DAS using the simulated cable for which a POM bar was employed as the core. The reason why the measurement result in the case of using the POM bar is taken up here is because it is inferred that sensitivity in measurement in the case of using the POM bar is highest as compared to the cases of using the other cores. In these graphs, FIG. 15A shows a measurement result in the case of measuring the caused strain by DAS, when the incident angle θ is 60 degrees, with the horizontal axis indicating the measurement distance (unit: m) on the fiber and the vertical axis indicating the caused strain amount (unit: nε), as in FIGS. 13A and 13B.

In addition, for the purpose of comparing the measurement result with a theoretical value, FIG. 15B shows comparison between the measurement result and the theoretical value, with the horizontal axis indicating the optical fiber laying angle α and the vertical axis indicating the normalized relative sensitivity. As shown in the graph in FIG. 15B, it is found that almost all the measurement data well coincide with the theoretical value, except for one data.

Further, specific values of the relative sensitivity depending on difference in cores are collectively shown in FIG. 16. It is known that the elastic modulus of the POM bar is ten or more times smaller than that of the aluminum bar, i.e., the POM bar is softer than the aluminum bar. Therefore, conversely, the strain ratio parameter A of the POM bar is one or more orders of magnitude greater than that of the aluminum bar, and it is found that, for almost all the laying angles, the relative sensitivity of the POM bar is also greater than that of the aluminum bar, irrespective of the incident angle. That is, it has been found that the softer the material of the core is, the higher the relative sensitivity is.

As described above, it has been found that, by using the optical cable to which the optical fiber as a sensor is provided at the predetermined optical fiber laying angle $α_{opt}$, it is possible to measure a generated seismic wave by DAS even when the seismic wave is incident in a direction perpendicular to or almost perpendicular to the longitudinal direction of the optical cable.

A representative configuration of the optical cable that satisfies the above condition is shown in FIG. 17A to FIG. 17D. FIG. 17A is a perspective view showing the entire configuration of such an optical cable, and FIG. 17B is a sectional view showing a cross section along the direction perpendicular to the longitudinal-direction axis of the optical cable shown in FIG. 17A. FIG. 17C is a perspective view, where the constituent components (the plurality of steel wires, etc.) at the outermost circumferential part are all removed in the sectional view shown in FIG. 17B, and FIG. 17D is a sectional view showing a cross section in the direction perpendicular to the longitudinal-direction axis in FIG. 17C.

In FIG. 17A, an optical fiber 7a as a sensor is provided at the central axial part of a stress wave detection optical cable 30 having a structure in which the outer circumference of the optical fiber 7a is surrounded by a plurality of steel wires 8 (hereinafter, these steel wires may be referred to as first steel wires) that are helically twisted, and further, the outer circumference thereof is protected by a flexible material 9 which is softer material than a surrounding object (hereinafter, referred to as cable surrounding body) surrounding the optical cable at the location where the optical cable is placed (examples of the flexible material include plastic). It is noted that the cable surrounding body 33 (not shown) includes bedrock or the like.

As shown in FIG. 17B, the stress wave detection optical cable 30 is located in the outermost layer of an optical cable 31 having a multilayer structure in which wires are helically wound in multiple layers. This outermost layer is annularly formed by helically twisting the stress wave detection optical cable 30 and a plurality of steel wires 32 (hereinafter, may be referred to as second steel wires) having outer diameters approximately equal thereto. Therefore, the outer diameters of the second steel wires are greater than those of the first steel wires. In addition, as shown in FIG. 17B, between the outermost layer and the inner layer adjacent thereto, a flexible material 9a which is a relaxation layer formed by a flexible material that does not allow liquid to pass therethrough may be provided so as to surround the entire circumference. Further, at the axial part of the optical cable, an optical fiber 7b having a pressure sensor function, which is different from the optical fiber 7a, is provided.

As shown in FIG. 17C and FIG. 17D, the relaxation layer may be replaced with a flexible material 9b which is a water-permeable relaxation layer (the flexible material 9b is, for example, a layer formed in a mesh shape so as to allow entry of liquid from outside). In this case, even if the optical fiber 7b provided at the central axial part of the optical cable 31 is a sensor for pressure measurement, there is no influence on the pressure measurement. Therefore, the optical fiber 7b also can function as a sensor for stress wave detection. The optical fiber 7b is provided so as to correspond to the center axis of the optical cable 31, and the stress wave detection optical cable 30 is provided at a specific winding angle with respect to the center axis. Therefore, when these two members are operated at the same time, two incident angles are obtained with respect to an acoustic wave (or seismic wave), and thus the optical cable is expected to function as an optical cable having increased sensitivity.

In the above configuration, the plurality of steel wires 32 may be partially replaced with a metallic-tube-coated optical fiber cable, i.e., an FIMT (abbreviation of Fiber In Metallic Tube) 32a. Instead of the uniformly surrounding flexible material 9, a Kevlar fiber (softer than steel wire) having an outer diameter of about 5 μm may be helically wound.

Here, a winding angle β of the stress wave detection optical cable 30 with respect to the longitudinal-direction axis of the optical cable is set on the basis of the optical fiber laying angle $\alpha_{opt}$ described above, and the winding angle β is determined from physical property values of the flexible material 9 and the cable surrounding body 33 (for example, bedrock). Specifically, the winding angle β is determined using the above Expression (8) and Expression (9) on the basis of Lamé constants $\lambda_9$, $\mu_9$ and $\lambda_{33}$, $\mu_{33}$ (see Expression (23) and Expression (24)) of the materials of the flexible material 9 and the cable surrounding body 33, calculated from their elastic moduli E and Poisson's ratios v.

It is preferable that the flexible material 9 is provided not only at the outer circumference of the steel wires 8 described above but also in the gap between the optical fiber 7a and the steel wires 8.

$$E = \frac{\mu(3\lambda + 2\mu)}{(\lambda + \mu)} \quad (23)$$

$$v = \frac{\lambda}{2(\lambda + \mu)} \quad (24)$$

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated. For example, in the above embodiment 1, the case where the optical cable is located in the outermost layer of the multilayer cable has been described. However, without limitation thereto, the optical cable may be located in a layer inward of the outermost layer, whereby the same effect is obtained.

DESCRIPTION OF THE REFERENCE CHARACTERS 1 core
2, 7a, 7b optical fiber
3, 31 optical cable
4, 4a, 4b, 4c simulated cable
5 measurement optical fiber
5a, 5b stress wave detection optical fiber
6 semiconductor strain gauge
6a trigger gauge
6b incident wave/reflected wave measurement gauge
6c transmitted wave measurement gauge
8, 32 steel wire
9, 9a, 9b flexible material
10 mortar block
11 stress wave trapping block
20 strain measurement instrument
30 stress wave detection optical cable
32a FIMT
33 cable surrounding body
A strain ratio parameter
α optical fiber laying angle
θ incident angle of acoustic wave

The invention claimed is:

1. An optical cable for measuring a stress wave generated by vibration of a measurement target, the optical cable comprising:
    a stress wave detection optical cable including an optical fiber provided at an axial part, a plurality of first steel wires helically wound so as to surround the optical fiber, and a flexible material surrounding the optical fiber and the plurality of first steel wires; and
    second steel wires different from the first steel wires, wherein
    the stress wave detection optical cable and the second steel wires are helically wound to form one annular body as a whole, and
    a winding angle (α) of the stress wave detection optical cable with respect to an axis of the optical cable is a function of a strain ratio parameter (A), wherein the strain ratio parameter (A) is a function of two Lamé constants (λ, μ),
    each of said Lamé constants (λ, μ) being a function of an elastic moduli (E) and a Poisson's ratio (v) of the flexible material and a cable surrounding body surrounding the optical cable at a location where the optical cable is placed;
    wherein:

$$A = 2\tan^2\alpha, \; A = \frac{\lambda_0 + 2\mu_0}{\lambda + 2\mu}, \; E = \frac{\mu(3\lambda + 2\mu)}{(\lambda + \mu)}, \; v = \frac{\lambda}{2(\lambda + \mu)}.$$

2. The optical cable according to claim 1, wherein the stress wave detection optical cable is located at an outermost circumference of the optical cable.

3. The optical cable according to claim 1, further comprising:
- a second optical fiber provided at an axial part of the optical cable, and being capable of measuring a pressure; and
- a second flexible material which is a water-permeable relaxation layer having water-permeable property, the second flexible material being opposed to an inner annular surface of the one annular body.

4. The optical cable according to claim 1, wherein a gap between the optical fiber and the plurality of first steel wires is surrounded by the flexible material.

5. The optical cable according to claim 1, wherein a value of the strain ratio parameter of the flexible material is greater than a value of the strain ratio parameter of the cable surrounding body.

* * * * *